United States Patent [19]
Gentle et al.

[11] Patent Number: 5,480,930
[45] Date of Patent: Jan. 2, 1996

[54] FLUOROCARBON RUBBERS MODIFIED BY SILICONE RESINS

[75] Inventors: Thomas M. Gentle; Gerald A. Gornowicz, Midland, both of Mich.

[73] Assignee: Dow Corning Corporation, Midland, Mich.

[21] Appl. No.: 292,305

[22] Filed: Aug. 18, 1994

[51] Int. Cl.$^6$ ............................ C08K 3/32; C08F 8/00
[52] U.S. Cl. .................. 524/414; 524/420; 524/423; 524/425; 524/431; 524/432; 524/433; 524/520; 524/474; 525/101; 525/102; 525/104; 525/106
[58] Field of Search ................... 524/414, 420, 524/423, 425, 431, 432, 433, 520; 525/101, 1025, 104, 106, 474

[56] References Cited

U.S. PATENT DOCUMENTS

| | | | |
|---|---|---|---|
| 3,415,900 | 12/1968 | Robb . | |
| 3,538,028 | 11/1970 | Morgan . | |
| 4,263,414 | 4/1981 | West | 525/102 |
| 4,369,279 | 1/1983 | Emerick | 525/104 |
| 4,450,263 | 5/1984 | West | 525/102 |
| 5,010,137 | 4/1991 | Umeda et al. | 525/104 |
| 5,132,366 | 7/1992 | Kashida et al. | 525/104 |

FOREIGN PATENT DOCUMENTS

| | | | |
|---|---|---|---|
| 485906A2 | 5/1992 | European Pat. Off. . | |
| 3022307 | 1/1991 | Japan . | |
| 5177768 | 7/1993 | Japan . | |
| WO82/01560 | 5/1982 | WIPO | 525/104 |

*Primary Examiner*—John C. Bleutge
*Assistant Examiner*—Mark D. Sweet
*Attorney, Agent, or Firm*—James E. Bittell

[57] ABSTRACT

The present invention describes uncured fluorocarbon elastomer base compositions and cured fluorocarbon elastomer compositions comprising a fluorocarbon elastomer, an amorphous silicone resin, and optionally a polydiorganosiloxane gum or a hydrocarbon polymer elastomer. The cured fluorocarbon elastomers typically contain additional components such as an acid acceptor, a cure agent, and a filler. The cured compositions have high strength, low temperature flexibility, high solvent resistivity, and low fuel permeability.

20 Claims, No Drawings

FLUOROCARBON RUBBERS MODIFIED BY SILICONE RESINS

The present invention describes uncured fluorocarbon rubber base compositions and cured fluorocarbon rubber compositions comprising a fluorocarbon elastomer, an amorphous silicone resin, and optionally a polydiorganosiloxane gum or a hydrocarbon polymer elastomer. The cured fluorocarbon rubbers typically contain additional components such as an acid acceptor, a cure agent, and a filler. The cured compositions have high strength, low temperature flexibility, high solvent resistivity, and low fuel permeability.

Fluorocarbon polymers are well known for their chemical inertness and high temperature stability. The fluorocarbon resins are crystalline or semicrystalline polymers some of which are processed only as powders by methods such as sintering while others can be processed by more conventional thermoplastic techniques such as injection molding. The fluorocarbon elastomers are noncrystalline polymers with a glass transition temperature less than 25° C. and are processed by conventional compounding and mixing techniques such as roll milling at temperatures of about 120° C.

Little is known about blends of silicone resins with fluorocarbon elastomers, although blending a silicone resin with a fluorocarbon resin has been suggested. Japanese Patent Application No. HEI 5 (1993)-177768A suggests blending certain types of silicone resin with a fluorocarbon resin for use in coating cookware to provide food release properties. The fluorocarbon resin used are crystalline or semicrystalline materials having a glass transition temperature above 25° C. with the preferred material described as tetrafluoroethylene and perfluoroalkyl vinyl ether copolymer. Japanese Patent No. 3022307 teaches a heat resistant wire coating comprising a polytetrafluoroethylene-polypropylene copolymer, a polyvinylidene fluoride resin and a graft copolymer of a silicone resin and a polyolefin resin.

Blends of fluorocarbon elastomers and silicone elastomer gums are better known in the art. West in U.S. Pat. Nos. 4,263,414 and 4,450,263, teaches blends of a fluorocarbon gum comprising 60 to 85 mol percent vinylidene fluoride, 10 to 40 mol percent hexafluoropropene and 0.15 to 3 mol percent bromine-containing olefin, with a fluorosilicone elastomer gum for use as elastomers in automotive applications where low-temperature stability and solvent resistivity are necessary. Robb, in U.S. Pat. No. 3,415,900, issued Dec. 10, 1968, and Morgan, in U.S. Pat. No. 3,538,028, issued Nov. 3, 1970, teach rubbers made from blends of fluorocarbon elastomers and silicone elastomer gums. Kaneko et al., in EPO Patent Application 0 485 906 A2, published May 20, 1992, describe a rubber composition comprising a fluorocarbon elastomer and a silicone elastomer gum having an amino group.

The composition of the present invention comprises a novel blend of a fluorocarbon elastomer, an amorphous silicone resin, and optionally, a polydiorganosiloxane gum or a hydrocarbon polymer elastomer. Such blends are useful without the optional components as a high-tear-strength coating for fuser rolls in photocopiers and printers. With the optional silicone or hydrocarbon gum, the compositions are useful in automotive elastomer applications requiring low-temperature stability and solvent resistivity. The amorphous silicone resin imparts the added benefit of low fuel permeability to the cured rubber. Low fuel permeability is very important for elastomeric seals used to contain fuel or oil at elevated temperatures. Blends of fluorocarbon elastomers with only silicone gums typically exhibit unacceptably high fuel permeability.

SUMMARY OF INVENTION

The present invention relates to a composition comprising a fluorocarbon elastomer, an amorphous silicone resin, and optionally a polydiorganosiloxane gum or a hydrocarbon polymer elastomer. The cured fluorocarbon rubbers typically contain additional components such as an acid acceptor, a cure agent, and a filler. The cured compositions have high strength, low temperature flexibility, high solvent resistivity, and low fuel permeability.

DETAILED DESCRIPTION OF INVENTION

The present invention relates to uncured fluorocarbon rubber base compositions and cured fluorocarbon rubber compositions comprising: (a) 50 to 95% by weight of a fluorocarbon elastomer having a Mooney viscosity of 5 to 160, (b) 5 to 50% by weight of an amorphous silicone resin, (c) 0 to 40% by weight of polydiorganosiloxane gum, and (d) 0 to 40% by weight of a hydrocarbon polymer elastomer.

Cured fluorocarbon rubbers are formed by adding additional components such as an acid acceptor, a cure agent, and a filler to the rubber base composition and then heating to accelerate the cure reactions.

Fluorocarbon elastomers are noncrystalline polymers that exhibit elastomeric properties when cross-linked. Commercially useful fluorocarbon elastomers have Mooney viscosities of 5 to 160 (ASTM D1646) with a glass transition temperature less than 25° C. Fluorocarbon elastomers are typically prepared by high pressure, free radical, aqueous emulsion copolymerization of monomers such as vinylidene fluoride, $CF_2=CH_2$, chlorotrifluoroethylene, $CF_2=CFCl$, hexafluoropropylene, $CF_2=CFCF_3$, tetrafluoroethylene, $CF_2=CF_2$, and perfluoro(methylvinylether), $CF_2=CFOCF_3$. Bromine and iodine-containing fluoroolefins may be copolymerized with the above monomers to allow peroxide cure as described in U.S. Pat. Nos. 4,035,565; 4,418,186; and 4,263,414. Examples of commercial fluorocarbon polymers include copolymers of vinylidene fluoride (VDF) and hexafluoropropene (HFP); copolymers of tetrafluoroethylene (TFE) and ethylene or propylene; terpolymers of VDF, HFP, and TFE; terpolymers of VDF, TFE, and perfluoro(methylvinylether) (PMVE); tetrapolymers of VDF, HFP, TFE and other fluorine-containing units; tetrapolymers of VDF, TFE, PMVE and other fluorine-containing units. Examples of the other fluorine-containing units that may be included in the tetrapolymers include olefins, e.g., chlorotrifluoroethylene.

Fluorocarbon polymers suitable for use in the present composition and their methods of manufacture are described in the following U.S. Patents which are hereby incorporated by reference: Futami et al., U.S. Pat. No. 4,028,431, issued Jun. 7, 1977; Apotheker et al., U.S. Pat. No. 4,035,565, issued Jul. 12, 1977; Bush et al., U.S. Pat. No. 4,525,528, issued Jun. 25, 1985; Carlson et al., U.S. Pat. No. 5,037,921, issued Aug. 6, 1991; Moore, U.S. Pat. No. 5,077,359, issued Dec. 31, 1991; and Carlson et al., U.S. Pat. No. 5,214,106, issued May 25, 1993.

Amorphous silicone resins useful in the present invention are also known in the art and are commercially available. Silicone resins are cross linked polymers formed by hydrolysis and condensation of chlorosilane or alkoxysilane monomers which are tri or tetra functional such as methyltrichlorosilane, propyltrichlorsilane, phenyltrichlorsilane, methyltrimethoxysilane, silicon tetrachloride and ethylorthosilicate. Silicone resins may also be formed by hydrolysis and condensation of mixtures of the tri or tetra functional monomers with mono or difunctional monomers such as trimethylchlorosilane, dimethylvinylchlorosilane, dimethyldichlorosilane, and diphenyldichlorosilane. When mixtures of monomers are used, silicone resins are generally obtained when the proportion of monomers is selected to provide an average number of organic substituents per silicon atom of about 0.9 to 1.8 which is referred to as the degree of substitution (ds) of the resin. Examples of the amorphous silicone resins include resins containing trimethylsiloxane and silicate units; resins containing trimethylsiloxane, vinyldimethylsiloxane and silicate units; resin containing phenylsiloxane and propylsiloxane units; resin containing phenylsiloxane units; resin containing methylsiloxane, phenylsiloxane, diphenylsiloxane, and phenylmethylsiloxane units; resin containing trifluoropropylsiloxane, trimethylsiloxane and silicate units; resin produced from reacting a resin containing trimethylsiloxane and silicate units with a perfluoroalkylethanol or mixture of perfluoroalkylethanols such as $F(CF_2CF_2)_nCH_2CH_2OH$ where n is 2 to 8; and resin containing phenylsiloxane, diphenylsiloxane and aminopropylsiloxane units. The preferred amorphous silicone resin contains trimethylsiloxane and silicate units.

Amorphous silicone resins suitable for use in the present composition and their methods of manufacture are described in the following U.S. Patents which are hereby incorporated by reference: Rochow, U.S. Pat. No. 2,371,068, issued Mar. 6, 1945; Hyde, U.S. Pat. No. 2,377,689, issued Jun. 5, 1945; Sprung, U.S. Pat. No. 2,383,827, issued Aug. 28, 1945; Wright et al., U.S. Pat. No. 2,389,477, issued Nov. 20, 1945; Hyde, U.S. Pat. No. 2,413,050, issued Dec. 24, 1946; Daudt et al., U.S. Pat. No. 2,676,182, issued Apr. 20, 1954; Keil, U.S. Pat. No. 4,554,296, issued Nov. 19, 1985; and Gornowicz et al., U.S. Pat. No. 5,262,507, issued Nov. 16, 1993.

In one embodiment, the rubber base or cured rubber contains either a polydiorganosiloxane gum or, a hydrocarbon polymer elastomer or a mixture of both. polydiorganosiloxane gums are very high-viscosity linear polymers with Williams plasticity numbers typically in the range of about 20 to 200 (ASTM D 926). The polydiorganosiloxane gums useful in the present invention are well-known and commercially available. Examples include polydiorganosiloxanes where the pendant organic groups are selected from monovalent hydrocarbon radicals having up to 20 carbon atoms. Examples of such radicals include alkyl, e.g., methyl, ethyl, propyl, isopropyl, hexyl, octadecyl, and myricyl; alkenyl, e.g., vinyl, allyl or hexenyl; cyclic, e.g., cyclopentyl, cyclohexyl, and cyclohexenyl; and aromatic, e.g. phenyl, tolyl, xylyl, xenyl, and naphtyl. The preferred polydiorganosiloxane gums are polydimethylsiloxane gum, polyphenylmethylsiloxane gum, polymethylvinylsiloxane gum, and copolymer gums comprised of phenylmethylsiloxane and methylvinylsiloxane units, and copolymer gums comprised of dimethylsiloxane and methylvinylsiloxane units. Most preferred are the copolymer gums containing dimethylsiloxane units and methylvinylsiloxane units.

Hydrocarbon polymer elastomers are non-crystalline polymers of unsaturated monomers containing only carbon and hydrogen. The hydrocarbon elastomers have a gum like viscosity and form rubbers when cured or vulcanized. Hydrocarbon elastomers are well-known in the art and are commercially available. Examples include nonpolar organic polymers typically used in rubber compositions, e.g., ethylene-propylene-diene polymer,(EPDM); natural rubber, ethylene-propylene copolymers, (EPM); styrene-butadiene copolymers,(SBR); polyisobutylene, (IM); polyisoprene, (IR); and polybutadiene (BR).

EPDM is preferred for use in the compositions because of its age resistance and low temperature capabilities relative to other hydrocarbon elastomers. Any EPDM elastomer can be used in the compositions. Typical EPDM contains about 60 mol % ethylene units, 39 mol % propylene units and about 1 mol % non-conjugated diene units and has a total of about 2500 monomer units per polymer molecule. Non-conjugated dienes such as 5-ethylidene-2-norbornene, dicyclopentadiene or 1,4-hexadiene are used.

The fluorocarbon rubber base compositions of this invention contain 50 to 95% by weight of the fluorocarbon elastomer and 5 to 50% by weight of the silicone resin. The base composition may contain 5% silicone resin and 50% fluorocarbon elastomer with the remainder of the base made up of other components or it may consist of only the silicone resin and fluorocarbon elastomer. When improvements in the low temperature properties are desired, up to 40% by weight of either the polydiorganosiloxane gum or the hydrocarbon elastomer can be included in the base. Rubber base compositions having 1 to 40%, preferably 5 to 20% of the polydiorganosiloxane gum or hydrocarbon polymer elastomer are preferred for making rubber for low temperature uses.

To form cured fluorocarbon elastomers, the fluorocarbon rubber base composition is typically compounded with additional components such as an acid acceptor, a cure agent and a filler. After compounding the compositions are shaped and thermally treated to complete the cure. Cure agents, acid acceptors and fillers used with conventional fluorocarbon elastomers can be used with the fluorocarbon rubber bases of this invention. Specifically, fluorocarbon elastomer may be cross linked by incorporating cure agents or combinations of cure agents such as (A) a bisphenol and a organic onium salt accelerator, for example bisphenol A or bisphenol AF with triphenylbenzylphosphonium chloride or diphenylbenzyl(diethylamine)phosphonium chloride; (B) a polyfunctional organic amine or derivative of the amines such as a carbamate, for example hexamethylenediamine carbamate; and (C) organic peroxides and cure promoters which act with the free radicals generated from decomposition of the peroxide to provide a more useful cure.

The polydiorganosiloxane gums are typically cured with organic peroxides so that one may simultaneously cure both the fluorocarbon elastomer and the silicone gum, when organic peroxides are used for curing the compositions of this invention. However the fluorocarbon elastomer may be cured by either of the other non peroxide methods, in which case it is preferred to use an organic peroxide in conjunction with the other cure system to assure cure of the silicone portion of the blend.

Organic peroxides with decomposition temperatures above 75° C. and ranging up to about 175° C. are preferred. Dialkylperoxides are preferred, with peroxides having a t-butyl group attached to the peroxy oxygen being most preferred. Among the most useful peroxides of this type are 2,5,-dimethyl-2,5-di(t-butylperoxy)hexyne- 3 and 2,5,-dimethyl-2,5-di(t-butylperoxy) hexane. Other useful peroxides include dicumyl peroxide, dibenzoyl peroxide, t-butyl perbenzoate, and di[1,3-dimethyl-3-(t-butylperoxy)butyl] carbamate, 2,4-dichlorobenzoyl peroxide, di-tbutyl peroxide, para-dichlorobenzoyl peroxide, , t-butyl-t-triptyl peroxide, monochlorobenzoyl peroxide, and t-butylperoxyisopropylcarbonate Cure promoters are usually added along with the peroxide to improve the cure. Cure promoters are compounds containing multiple carbon-carbon double bonds susceptible to free radical reactions. Preferred cure promoters include such compounds as triallyl cyanurate, triallyl isocyanurate, tri(methallyl) isocyanuarte, tris(diallylamine)-s-triazine, triallyl phosphite, N,N,-diallyl acrylamide, hexaallyl phosphoramide, N,N,N',N'-tetraallyl tetraphthalamide, N,N,N',N'-tetraallyl malonamide, trivinylisocyanurate, 2,4,6-trivinyl methyltrisiloxane, and tri(5-norbene- 2-methylene)cyanurate- The preferred curing agents include a combination of an organoperoxide such as 2,5,-dimethyl- 2,5-di(t-butylperoxy) hexane and triallylisocyanurate as a co-curing agent.

The curing agents are used in amounts of from about 0.5 to 10 parts, per 100 parts of the fluorocarbon elastomer base composition, and preferably about 1 to 7 parts.

Hydrofluoric acid can be released as a byproduct of the curing reaction. Since the hydrofluoric acid can be detrimental to the composition, the composition includes an acid acceptor. The acid acceptor is typically an inorganic base. Acid acceptors known in the art to be useful in fluorocarbon elastomer compositions are suitable. Examples of the acid acceptor include calcium hydroxide, magnesium oxide, lead oxide, lead hydrogen phosphate, and calcium oxide.

The preferred composition also comprises a filler. Examples of fillers include carbon black; coal dust fines; silica; metal oxides, e.g., iron oxide and zinc oxide; zinc sulfide; calcium carbonate; and barium sulfate. The preferred fillers are carbon black, coal dust fines and silica.

The cured fluorocarbon rubber obtained from the rubber base compositions typically contain for each 100 parts of base, from 0.5 to 15 parts by weight of the acid acceptor, 0.5 to 10 parts by weight of one or more curing agents and 2 to 60 parts by weight of a filler. The compositions can also contain other additives conventionally used in fluorocarbon elastomer compositions, such as process aids and pigments.

The compositions are prepared by mixing all components except the curing agent. Mixing is done in standard equipment used for compounding rubber, for example, a two-roll mill, a dough mixer, or an internal mixer, such as a Banbury or Narpco mixer. The order of addition of the ingredients to the mixer is not important. Mixing continues until the components are blended. The length of mixing time is not critical, a typical time is between 10 minutes and 1 hour.

The curing agent is added to the composition following mixing of the components. When an organoperoxide compound is used in combination with triallylisocyanurate as a co-curing agent, it is preferred that the triallylisocyanurate is added to the mixer near the end of the mixing of the other components. Mixing is continued for several minutes to disperse the triallylisocyanurate in the composition. Then, the organoperoxide compound is added to the composition. It is preferred that the organoperoxide compound be banded into the composition on a two-roll mill.

The compositions containing the curing agent are typically coated onto a surface to form a coating, or compression molded to form an elastomer. The composition is then subjected to elevated temperatures to effect cure. Temperatures in a range of about 150° C. to 200° C. are preferred.

The following examples are illustrative and are not intended to limit the scope of the invention.

Examples. In accordance with this invention, elastomer base compositions were formed from commercially available fluorocarbon elastomers, amorphous silicone resins, polydiorganosiloxane gums or hydrocarbon polymer elastomers, acid acceptors, fillers, and other common elastomer components. The fluorocarbon elastomers were Tecnoflon® P419, Tecnoflon® T838K and Tecnoflon®P819, which were purchased from Ausimont U.S.A., Inc., Morristown, N.J., and Viton® GFLT and Viton® A, which were purchased from E. I. DuPont de Nemours and Company, Wilmington, Dela. Tecnoflon® P419 (FP1) and Tecnoflon® P819 (FP2) are peroxide curable terpolymers made from VDF, HFP, TFE, which may contain other fluorine-containing units. Viton® GFLT (FP3) is a terpolymer of VDF, PMVE, and TFE. Tecnoflon® T838K (FP4) and Viton® A (FP5) are copolymers of VDF and HFP.

The polydiorganosiloxane gums and hydrocarbon elastomer polymer used in the base compositions were:

Silicone 1—A polydiorganosiloxane gum having as a percentage of all organic radicals in the gum, 99.848% methyl radicals and 0.152% vinyl radicals, and having a Williams plasticity in a range of about 55 to 65 mils;

Silicone 2—A hydroxyl-endblocked dimethylsiloxane and methylvinylsiloxane copolymer containing about 4 mol percent methylvinylsiloxane units, and having a Williams plasticity in a range of about 140 to 178 mils;

Organic 1—An ethylene-propylene-diene gum with a Mooney viscosity of about 54 (ASTM D1646).

Silicone 1 was either added to the other components alone, or as part of a base stock which comprised 77 wt % silicone 1; 23 wt % treated fumed silica, wherein the silica has a surface area in a range of about 250 $m^2/g$ and the treating agent is a hydroxyl-endblocked polydimethylsiloxane having about 4 wt % silicon-bonded hydroxyl radicals, a viscosity of about 0.04 Pa·s and a molecular weight in a range of about 750–800. The treated silica comprises about 75 wt % of silica and about 25 wt % of the treating agent. This mixture is referenced as "silicone 1 base" in the following tables.

The compositions containing FP1 (Table I) employed fumed silica which had a surface area of about 250 $m^2/g$, as well as a treating agent for the fumed silica which was a hydroxyl-endblocked trifluoropropylmethylsiloxane containing about 6 wt % silicon bonded hydroxyl groups. The treating agent is abbreviated in Table I as TFPS.

The silicone resins employed in the compositions were:

Resin 1—A powder obtained by air or spray drying a 65 percent solution in xylene of a resinous organosiloxane copolymer consisting essentially of $(CH_3)_3SiO_{1/2}$ and $SiO_2$ units with a molar ratio of $(CH_3)_3SiO_{1/2}$:$SiO_2$ units of about 0.75. The resin can be prepared as described in U.S. Pat. No. 2,676,182, and typically contains from about 0.5 to about 3 wt % of hydroxyl groups.

Resin 2—A powder obtained by air or spray drying a 65 percent solution in xylene of resinous organosiloxane copolymer containing trimethylsiloxane, dimethylvinylsiloxane and $SiO_2$ units in the molar ratio of about 0.7 mol of combined trimethylsiloxane and dimethylvinylsiloxane units per mol of $SiO_2$ units and from 1.4 to 2.2 wt % of silicon-bonded vinyl radicals.

Resin 3—A resin produced by hydrolyzing 70 mol % phenyltrichlorosilane and 30 mol % propyltrichlorosilane.

Resin 4—A resin produced by hydrolyzing phenyltrimethoxysilane.

Resin 5—A resin produced by hydrolyzing 45 mol % methyltrichlorosilane, 40 mol % phenyltrichlorosilane, 10 mol % diphenyldichlorosilane, and 5 mol % phenylmethyldichlorosilane.

Resin 6—A resin containing trimethylsiloxane trifluoropropyldimethylsiloxane, and silicate units prepared by the same method as Resin 1 with trifluoropropyldimethylsiloxane units substituted for half of the trimethylsiloxane units of Resin 1.

Resin 7—A resin produced by reacting Resin 1 with perfluoroalkylethanols of the formula $F(CF_2CF_2)_nCH_2CH_2OH$ where n is 2 to 8.

Resin 8—A resin produced by acid hydrolysis followed by base equilibration of phenyltrimethoxysilane, octaphenylcyclotetrasiloxane and aminopropyltrimethoxysilane as described in Example 1 of U.S. Pat. No. 5,262,507.

Except where otherwise noted in a table, each rubber base was prepared in the following manner. First, the components, as specified in the tables, were added to a Haake mixer which had been heated to the temperature specified in the table. All quantities are expressed as weight parts. The components were mixed for about 20 minutes. At the end of 20 minutes of mixing, triallylisocyanurate (TAIC) was added to the base and mixed in for several minutes. The base was then removed from the mixer without cooling and was banded onto a two-roll mill. A curing catalyst comprising about 50 wt % active 2,5-dimethyl-2,5-di(t-butylperoxy)hexane (referred to as perox) was then added and milled into the base. The base temperature was no greater than 130° C. when perox was added to the base. After the perox was milled into the base, the base was compression molded (press-cured) between two sheets of calendared Teflon® for 20 minutes at a temperature of 177° C. The pressure employed for the first 30 to 60 seconds of compression molding was less than 3.45 MPa to allow the base to fill the mold. The pressure was then raised to 13.8 MPa for the remaining period of the 20 minutes. The press-cured elastomer was then post-cured for 16 hours at 200° C.

Following preparation of the cured elastomers, tests were performed on them to determine various properties. Mechanical properties such as tensile strength, elongation, 100% modulus, tear strength, durometer, and compression set were measured by standard procedures.

Retraction at lower temperatures was measured according to ASTM 1329-88 (abbreviated as TR test). The elastomer samples were either dry (not soaked in fuel) or soaked in a fuel for 1 week at 22° C. prior to performing the TR test. The TR test involved: elongating the elastomer sample, locking the sample in the elongated condition, freezing it to a state of reduced elasticity, releasing the frozen specimen and allowing it to retract freely while raising the temperature at a uniform rate, measuring the length of the specimen at regular temperature intervals during retraction, and computing the percentage retraction at those temperatures. The results are expressed in the Tables as $TR_{10}$ values. The $TR_{10}$ value is the temperature which corresponds to 10% retraction. The fuels in which the elastomer samples were soaked prior to TR testing were iso-octane and Reference Fuel C (RFC).

The percent volume swell at room temperature in several different types of fuel was also measured. Weighed samples were placed in the fuel for two days, quickly blotted and reweighed. The percent weight increase was calculated from the value upon reweighing. The percent volume increase was calculated from the percent weight increase by dividing the percent weight increase by the density of the fuel. For fuels comprised of pure solvents, the densities were obtained from handbooks. For fuel blends, the densities were measured. The fuels employed in these examples were: isooctane which had a density of 0.69 g/cc; methanol which had a density of 0.79 g/cc; RFC, which was a 50:50 mixture by volume of isooctane and toluene, and had a density of 0.77 g/cc; M40, which was a mixture of RFC containing 40% methanol by volume, and having a measured density of 0.78 g/cc; M60, which was a mixture of RFC containing 60% methanol by volume, and having a measured density of 0.785 g/cc; and M85, which was a mixture of RFC containing 85% methanol by volume, and having a measured density of 0.79 g/cc.

Volume swell, weight change, and hardness were also measured for elastomers after soaking at 60° C. for one week in RFC and M40. Several samples were tested for extractability. The samples were heated at reflux in M40 fuel for 1 week, then thoroughly dried to constant weight in a vacuum oven. The weight loss was greater for resins that did not have vinyl functionality, which was to be expected because perox, a vinyl specific catalyst, was employed to cure the elastomers.

The test results are provided in the Tables below.

TABLE I

| | Elastomers | | |
|---|---|---|---|
| | A | B | C |
| Formulation Components[a] | Weight Parts | | |
| FP1 | 80 | 100 | 100 |
| Resin 1 | 20 | 30 | 0 |
| Resin 2 | 0 | 0 | 30 |
| Fumed silica | 30 | 0 | 0 |
| TFPS | 6 | 0 | 0 |
| CaCO$_3$ | 6 | 8.5 | 8.5 |
| TAIC | 2.4 | 2.2 | 2.2 |
| Perox | 2.4 | 2.4 | 2.4 |
| Properties | | | |
| Tensile (MPa) | 11.7 | 9.86 | 7.58 |
| Elongation (%) | 120 | 310 | 325 |
| 100% Modulus (MPa) | — | 4.76 | 3.52 |
| Tear (kN/m) | 52 | 32 | 27 |
| Durometer (A) | 93 | 84 | 81 |
| $TR_{10}$ (°C.) Dry | — | −7 | — |
| Isooctane | −12 | −17 | — |
| RFC | −24 | −25 | — |
| Vol. swell (%) | | | |
| Isooctane | — | 9 | — |
| RFC | 15 | 8 | — |
| M 40 | 20 | 12 | — |
| M 60 | 20 | 14 | — |
| M 85 | 16 | 20 | — |
| Methanol | 14 | 17 | — |

[a]Mixing temperature 210° C.

The tear strength values shown in Table II demonstrate that the siloxane resin provides as good or better reinforcement than obtained with the carbon black control. While carbon black fillers typically impact the surface adhesion properties of the cured fluorocarbon rubber significantly, silicone resins are not expected to alter the such properties very much.

TABLE II

| | Elastomers | | | | | | |
|---|---|---|---|---|---|---|---|
| | D | E | F | G | H | I | Control |
| Formulation Components[b] | | | weight parts | | | | |
| FP2 | 100 | 100 | 100 | 100 | 100 | 100 | 100 |
| Resin 2 | 30 | — | — | — | — | — | — |
| Resin 3 | — | 30 | — | — | — | — | — |
| Resin 4 | — | — | 30 | — | — | — | — |
| Resin 5 | — | — | — | 30 | — | — | — |
| Resin 6 | — | — | — | — | 26.5 | — | — |
| Resin 7 | — | — | — | — | — | 30 | — |
| MgO | 3 | 3 | 3 | 3 | 3 | 3 | — |
| Ca(OH)$_2$ | 6 | 6 | 6 | 6 | 6 | 6 | 6 |
| TAIC | 3 | 3 | 3 | 3 | 3 | 3 | 2.4 |
| Perox | 3 | 3 | 3 | 3 | 3 | 3 | 2.4 |
| Carbon Black | — | — | — | — | 14.5 | — | 30 |
| Properties | | | | | | | |
| Tensile (Mpa) | 8.41 | 4.83 | 2.86 | 10.3 | 6.14 | 12.4 | 21.3 |
| Elongation (%) | 235 | 105 | 60 | 130 | 210 | 310 | 130 |
| 100% Modulus (MPa) | 5.65 | 4.83 | — | 9.38 | 3.31 | 2.69 | 15.0 |
| Tear (kN/m) | 32 | 37 | 24 | 43 | 26 | 19 | 24 |
| Durometer (A) | 82 | 80 | 78 | 79 | 72 | 76 | 74 |

[b]Mixing temperature 120–130° C.

The lowered $TR_{10}$ values shown in Table III for samples J, L and Control 1 demonstrates the improved low temperature properties of fluorocarbon rubbers containing silicone gums or combinations of silicone gum and silicone resin. However, the large volume swell observed with the Control 1 rubber (containing silicone gum but no silicone resin) is not acceptable in most applications. The rubber compositions J and L containing both silicone gum and silicone resin exhibit a substantially reduced and more acceptable amount of volume swell but still retain the desirable low $TR_{10}$ values.

TABLE III

| | Elastomers | | | | |
|---|---|---|---|---|---|
| | J | K | L | Control 1 | Control 2 |
| Formulation[c] | | | Weight Parts | | |
| FP1 | 80 | 80 | 70 | 70 | 100 |
| Silicone 1 Base | 13 | 13 | 19.5 | 39 | 0 |
| Resin 2 | 10 | 10 | 15 | 0 | 0 |
| Silica | 27 | 27 | 21 | 21 | 30 |
| CaCO$_3$ | 6 | 6 | 6 | 6 | 8.6 |
| TFPS | 6 | 6 | 6 | 6 | 8 |
| TAIC | 2.4 | 2.4 | 2.4 | 2.4 | 2.2 |
| Perox | 2.4 | 2.4 | 2.4 | 2.4 | 2.4 |
| Properties | | | | | |
| Tensile (MPa) | 12.5 | 11.3 | 10.5 | 7.86 | 20.7 |
| Elongation (%) | 180 | 145 | 145 | 210 | 195 |
| 100% Modulus (MPa) | 9.10 | 9.24 | 8.27 | 4.90 | 11.6 |
| Tear (kN/m) | 38 | 57 | 29 | 18 | 52 |
| Durometer (A) | 88 | 91 | 91 | 80 | 91 |
| $TR_{10}$ (°C.) | | | | | |
| Dry | −10 | — | — | — | −6 |
| Isoctane | −19 | — | −24 | −27 | −6 |
| RFC | −27 | — | −32 | — | — |
| Volume Swell R.T. | | | | | |
| Isooctane | 10 | — | 16 | 19 | — |
| RFC | 15 | — | 21 | 35 | — |
| M 40 | 18 | — | 22 | 33 | 8 |
| M 60 | 14 | — | 18 | — | — |
| M 85 | 9 | — | 10 | — | — |
| Methanol Volume Swell | 7 | — | 7 | — | — |

TABLE III-continued

|  | Elastomers | | | | |
|---|---|---|---|---|---|
|  | J | K | L | Control 1 | Control 2 |
| 1 week at 60° C. | | | | | |
| RFC | 26.92 | — | — | — | — |
| M 40 | 32.27 | — | — | — | — |
| % Weight Change 1 week at 60° C. | | | | | |
| RFC | −0.6 | — | — | — | — |
| M 40 | −1.12 | — | — | — | — | cMixing temperature 210° C.

TABLE IV

|  | Elastomers | | | | | | | |
|---|---|---|---|---|---|---|---|---|
|  | M | N | O | P | Q | R | S | Control |
| Formulation Components | | | | Weight Parts | | | | |
| FP2 | 80 | 80 | 73 | 82 | 70 | 80 | 80 | 80 |
| Silicone 1 Base | 13 | 13 | 11.8 | 10 | 22.4 | 13 | 13 | 26 |
| Carbon black | 24 | 24 | 12.7 | 24 | 21 | 24 | 24 | 24 |
| Resin 2 | 10 | 10 | 18.2 | 12 | 15 | 10 | 10 | 0 |
| $CaCO_3$ | 6 | 6 | 6 | 6 | 6 | 6 | 6 | 6 |
| TAIC | 2.4 | 2.4 | 2.4 | 2.4 | 2.4 | 2.4 | 2.4 | 2.4 |
| Perox | 2.4 | 2.4 | 2.4 | 2.4 | 2.4 | 2.4 | 2.4 | 2.4 |
| Conditions | | | | | | | | |
| Mixer Temp. (°C.) | 120 | 210 | 210 | 50 | 150 | 130 | 130 | 210 |
| Torque (m-g) | 550 | 400 | 300 | 1500 | 800 | 800 | 800 | — |
| Properties | | | | | | | | |
| Tensile (MPa) | 12.6 | 13.1 | 9.79 | 12.0 | 11.6 | 15.1 | 14.5 | 12.2 |
| Elongation (%) | 155 | 175 | 190 | 175 | 120 | 175 | 195 | 250 |
| 100% Modulus (MPa) | 9.72 | 9.31 | 7.52 | 8.48 | — | 10.8 | 9.51 | 5.54 |
| Tear (kN/m) | 26 | 26 | 50 | 29 | 24 | 32 | 26 | 17 |
| Durometer (A) | 81 | 85 | 87 | 81 | 90 | 82 | 82 | 73 |
| $TR_{10}$ (°C.) Isooctane | — | — | — | −18 | — | −18 | −18 | −19 |
| % Comp. Set 72 hr/50° C. | — | 37 | 42 | 41 | 37 | 37 | 37 | — |
| Permeability to M40 (g/day/cm) | — | — | — | — | — | — | 0.0014 | — |

The $TR_{10}$ data in Table IV further illustrates that the combination of silicone resin and silicone gum in the fluorocarbon rubber produces an improvement in low temperature properties comparable to the improvement obtained in the Control rubber modified only by the silicone gum.

The fluorocarbon elastomer used in the rubber compositions shown in Table V is a high performance elastomer that provides premium low temperature capability even without addtion of silicone as demonstrated by the $TR_{10}$ of −22. However, rubber sample U illustrates that lower and still better $TR_{10}$ values down to −30 can be obtained when this fluoroelastomer is modified by blending with both silicone resin and silicone gum. While similar improvement is shown in $TR_{10}$ using silicone gum without silicone resin, the volume swell is unacceptably high. In contrast the volume swell of sample U is substantially less.

TABLE V

| Formulation Components | Elastomer U$^d$ | Silicone Gum Control | No Silicone Control |
|---|---|---|---|
| | Weight Parts | | |
| FP3 | 80 | 80 | 100 |
| Resin 2 | 10 | 0 | 0 |
| Silicone 1 Base | 13 | 25 | 0 |
| Carbon Black | 24 | 24 | 30 |
| CaCO$_3$ | 10 | 7 | 0 |
| TAIC | 3 | 1.8 | 2 |
| Perox | 3 | 2.4 | 0 |
| Ca(OH)$_2$ | | | 6 |
| MgO | | | 3 |
| Lupersol 101 | | | 1.2 |
| Conditions | | | |
| Mixer Temp. (°C.) | 130 | | |
| Properties | | | |
| Tensile (MPa) | 9.93 | 6.55 | 17.9 |
| Elongation (%) | 160 | 225 | 150 |
| 100% Modulus (MPa) | 7.38 | — | 10.2 |
| Tear (kN/m) | 22 | — | 23 |
| Durometer (A) | 77 | — | 67 |
| % Comp. Set (72 hr/150° C.) | 40 | — | — |
| TR$_{10}$ | | | |
| Dry | −21 | −26 | −22 |
| Isooctane | −30 | −28 | −22 |
| Volume Swell R.T. | | | |
| RFC | 14 | 34 | 1 |
| M 40 | 14 | 27 | 8 |

$^d$Resin 2 and Silicone 1 Base were premixed for 10 minutes at 210° C.; FP3, carbon black, and CaCO$_3$ were premixed for 20 minutes at 210° C.; the two premixes were mixed for 20 minutes at 130° C. Post cure was overnight at 200° C.

TABLE VI

| Formulation Components | Elastomers | | | |
|---|---|---|---|---|
| | V | W | X | Y |
| | Weight Parts | | | |
| FP2 | 80 | 80 | 80 | 80 |
| Silicone 1 Base | 11.6 | 11.6 | 11.6 | 11.6 |
| Resin 3 | 10 | 0 | 0 | 0 |
| Resin 4 | 0 | 0 | 10 | 0 |
| Resin 5 | 0 | 10 | 0 | 0 |
| Resin 8$^e$ | 0 | 0 | 0 | 10 |
| Carbon Black | 27 | 27 | 27 | 27 |
| MgO | 3 | 3 | 3 | 3 |
| Ca(OH)$_2$ | 6 | 6 | 6 | 6 |
| TAIC | 3 | 3 | 3 | 3 |
| Perox | 3 | 3 | 3 | 3 |
| Conditions | | | | |
| Mixing Temp.(°C.) | 120–130 | 120–130 | 120–130 | 120–130 |
| Torque (m-g) | — | 1000 | 1300 | 1000 |
| Properties | | | | |
| Tensile (MPa) | 14.3 | 14.0 | 14.3 | 11.9 |
| Elongation (%) | 195 | 155 | 190 | 130 |
| 100% Modulus (MPa) | 8.89 | 10.7 | 8.96 | 9.38 |
| Tear (kN/m) | 44 | 45 | 40 | 26 |
| Durometer (A) | 83 | 87 | 87 | 81 |

$^e$Resin 8 was added to the formulation on the mill while adding curing catalysts The rubbers shown in Table VI illustrate the blending of several different silicone resins with the fluorocarbon elastomer to provide a range of properties.

TABLE VII

| Formulation Components | Elastomers | | | |
|---|---|---|---|---|
| | Z | AA | BB | CC |
| | Weight Parts | | | |
| FP2 | 80 | 80 | 80 | 80 |
| Silicone 1 | 10 | 5 | 5 | 0 |
| Silicone 2 | 0 | 0 | 0 | 5 |
| Carbon Black | 24 | 24 | 10.4 | 24 |
| Resin 1 | 10 | 15 | 15 | 0 |
| Resin 2 | 0 | 0 | 0 | 15 |
| CaCO$_3$ | 6 | 6 | 6 | 6 |
| TAIC | 2.4 | 2.4 | 2.4 | 2.4 |
| Perox | 2.4 | 2.4 | 2.4 | 2.4 |
| Conditions | | | | |
| Mixer Temp. (°C.) | 100–130 | 100–130 | 100–130 | 100–130 |
| Torque (m-g) | 270 | 270 | 270 | 270 |
| Properties | | | | |
| Tensile (MPa) | 12.8 | 13.3 | 10.7 | 12.1 |
| Elongation (%) | 270 | 320 | 445 | 200 |
| 100% Modulus (MPa) | 5.65 | 5.65 | 3.03 | 8.89 |
| Tear (kN/m) | 23 | 38 | 25 | 51 |
| Durometer (A) | 74 | 78 | 67 | 90 |
| TR$_{10}$ (°C.) | −17 | −15 | −16 | −19 |
| Isooctane | | | | |
| % Comp. Set (72 hr/150° C.) | 45 | 56 | 59 | 59 |
| Extraction Wt. Loss (%) | 5 | 6 | — | — |

Table VII shows rubber formulations and the properties they exhibit when the silicone gum is blended directly with the fluorocarbon elastomer instead of being first blended with silica.

Table VIII shows that the compression set of the rubbers can be modified by changing the fillers. For example substituting coal dust fines for two thirds of the carbon black is shown to reduce the compression set from 45 to 28%.

TABLE VIII

| Formulation Components | Elastomers | | | |
|---|---|---|---|---|
| | DD | EE | FF | GG |
| | Weight Parts | | | |
| FP2 | 80 | 80 | 80 | 80 |
| Silicone 1 Base | 11.6 | 11.6 | 11.6 | 11.6 |
| Resin 2 | 10 | 10 | 10 | 10 |
| CaCO$_3$ | 6 | 6 | 6 | 6 |
| TAIC | 2.4 | 2.4 | 2.4 | 2.4 |
| Perox | 2.4 | 2.4 | 2.4 | 2.4 |
| Carbon Black | 24 | 16 | 12 | 8 |
| Coal Dust Fines | 0 | 8 | 12 | 16 |
| Properties | | | | |
| Tensile (MPa) | 13.5 | 12.2 | 11.8 | 10.8 |
| Elongation (%) | 195 | 185 | 180 | 180 |
| 100% Modulus (MPa) | 8.07 | 9.03 | 8.83 | 8.76 |
| Tear (kN/m) | 25 | 26 | 28 | 28 |
| Durometer (A) | 80 | 83 | 78 | 81 |
| % Comp. Set (72 hr/150°C.) | 45 | 31 | 35 | 28 |

Table IX shows formulations in which the amount of curing agents and types of acid acceptors are varied to improve compression set of the rubber.

TABLE IX

| | Elastomers | | | | |
|---|---|---|---|---|---|
| | HH | II | JJ | KK | LL |
| Formulation Components | | | Weight Parts | | |
| FP2 | 80 | 80 | 80 | 80 | 80 |
| Silicone 1 Base | 11.6 | 11.6 | 11.6 | 11.6 | 11.6 |
| Resin 2 | 10 | 10 | 10 | 10 | 10 |
| Carbon Black | 8 | 8 | 8 | 8 | 8 |
| Coal Dust Fines | 16 | 16 | 16 | 16 | 16 |
| TAIC | 2.4 | 3 | 4 | 3 | 4 |
| Perox | 2.4 | 3 | 4 | 3 | 4 |
| $CaCO_3$ | 6 | 6 | 6 | 0 | 0 |
| MgO | 0 | 0 | 0 | 3 | 3 |
| $Ca(OH)_2$ | 0 | 0 | 0 | 6 | 6 |
| Conditions | | | | | |
| Mixer Temp. (°C.) | 120–130 | 120–130 | 120–130 | 120–130 | 120–130 |
| Torque (m-g) | 700–800 | 700–800 | 700–800 | 850–900 | 900 |
| Properties | | | | | |
| Tensile (MPa) | 10.8 | 10.1 | 10.5 | 12.8 | 13.2 |
| Elongation (%) | 180 | 125 | 135 | 130 | 120 |
| 100% Modulus (MPa) | 8.76 | 7.45 | 9.65 | 11.8 | 12.5 |
| Tear (kN/m) | 28 | 28 | 30 | 32 | 29 |
| Durometer (A) | 81 | 84 | 85 | 86 | 85 |
| % Comp. Set (72 hr/150° C.) | 28 | 33 | 31 | 29 | 26 |

Rubber formulations MM and NN in Table X demonstrate cure of the rubber using respectively (a) an organic onium accelerator with a bisphenol cross-linking agent and (b) a diamine carbamate cross-linker such as hexamethylenediamine carbamate.

TABLE X

| | Elastomers | |
|---|---|---|
| | MM | NN |
| Formulation Components | Weight Parts | |
| FP4 | 80 | 0 |
| FP5 | 0 | 70 |
| Silicone 1 Base | 11.6 | 19.4 |
| Resin 2 | 10 | 0 |
| Resin 5 | 0 | 15 |
| Carbon black | 27.3 | 27.3 |
| MgO | 3 | 3 |
| $Ca(OH)_2$ | 6 | 6 |
| TAIC | 1.8 | 1.8 |
| Perox | 1.8 | 1.8 |
| Tecnoflon(R) FOR-ML X1[f] | 5 | 0 |
| Viton(R) Curative #20[g] | 2.2 | 0 |
| Diak #1[h] | 0 | 1.5 |
| Conditions | | |
| Mixer Temp. (°C.) | 120–130 | 120–130 |
| Torque (m-g) | 1300 | 1000 |
| Properties | | |
| Tensile (MPa) | 11.8 | 5.52 |
| Elongation (%) | 120 | 210 |
| 100% Modulus (MPa) | 11.2 | 6.27 |
| Tear (kN/m) | 33 | 44 |
| Durometer (A) | 90 | 86 |

TABLE X-continued

| | Elastomers | |
|---|---|---|
| | MM | NN |

[f]50/50 mix of Bisphenol AF and fluorocarbon elastomer
[g]33/67 mix of organophosphonium salt in fluorocarbon elastomer
[h]hexamethylenediamine carbamate

TABLE XI

| | Elastomer | |
|---|---|---|
| | OO | No Silicone Resin Control |
| Formulation Components | Weight Parts | |
| FP2 | 80 | 80 |
| Organic 1 | 10 | 20 |
| Resin 2 | 10 | 0 |
| Carbon Black | 10 | 10 |
| Coal Dust Fines | 20 | 20 |
| MgO | 3 | 3 |
| Ca(OH)2 | 6 | 6 |
| TAIC | 3 | 3 |
| Perox | 3 | 3 |
| Conditions | | |
| Mixer Temp. (°C.) | 120–130 | 120–130 |
| Torque (m-g) | 2200 | 2200 |
| Properties | | |
| Tensile (MPa) | 11.4 | 10.7 |
| Elongation (%) | 75 | 75 |
| Tear (kN/m) | 31 | 21 |
| Durometer (A) | 86 | 80 |

TABLE XI-continued

|  | Elastomer | |
| --- | --- | --- |
|  | OO | No Silicone Resin Control |
| TR$_{10}$ (°C.) | | |
| Isooctane | −22 | −22 |
| Volume Swell R.T. | | |
| Isooctane | 7 | 10 |
| RFC | 14 | 21 |
| M 40 | 13 | 21 |

The TR$_{10}$ values (−22 in comparison to about −7 for rubber made with only FP2) shown in Table XI for Sample OO and the Control rubber sample demonstrates the improved low temperature properties of fluorocarbon rubbers containing a hydrocarbon polymer gum or combinations of hydrocarbon polymer gum and silicone resin. However, the large volume swell observed with the Control rubber sample (containing hydrocarbon polymer gum but no silicone resin) is reduced significantly when the silicone resin is added in combination with the hydrocarbon polymer gum. Thus the compositions of this invention provide both improved low temperature flexibility and low swell in contact with hydrocarbon solvents and fuels.

TABLE XII

|  | Elastomer | | | | | | |
| --- | --- | --- | --- | --- | --- | --- | --- |
|  | 1 | 2 | 3 | 4 | 5 | 6 | 7 |
| Formulation Polymers | | | | Weight Parts | | | |
| FP1 | 0 | 90 | 80 | 70 | 0 | 0 | 0 |
| FP2 | 0 | 0 | 0 | 0 | 80 | 0 | 80 |
| FP3 | 100 | 0 | 0 | 0 | 0 | 80 | 0 |
| Silicone 1 | 0 | 10 | 20 | 30 | 10 | 20 | 20 |
| Resin 2 | 0 | 0 | 0 | 0 | 10 | 0 | 0 |
| Properties | | | | | | | |
| Relative Permeability | 1 | 10 | 49 | 156 | 7 | 67 | 41 |

Table XII shows the relative permeability of cured elastomer films. As the amount of silicone gum is increased, the permeability increases. However, comparing samples 5 and 7, it is seen that adding a similar amount of silicone resin does not increase permeability and may even lower it to some extent.

I claim:

1. A fluorocarbon rubber base composition comprising:
   (a) 50 to 95% by weight of a fluorocarbon elastomer having a Mooney viscosity of 5 to 160,
   (b) 5 to 50% by weight of an amorphous silicone resin having a degree of substitution of about 0.9 to 1.8,
   (c) 0 to 40% by weight of polydiorganosiloxane gum, and
   (d) 0 to 40% by weight of hydrocarbon polymer elastomer.

2. A composition according to claim 1, wherein the fluorocarbon elastomer is selected from a group consisting of copolymers of vinylidene fluoride and hexafluoropropene; copolymers of tetrafluoroethylene and ethylene or propylene; terpolymers of vinylidene fluoride, hexafluoropropene, and tetrafluoroethylene; terpolymers of vinyldiene fluoride, tetrafluoroethylene, and perfluoromethylvinylether; tetrapolymers of vinylidene fluoride, hexafluoropropene, and tetrafluoroethylene and chlorotrifluoroethylene; and tetrapolymers of vinylidene fluoride, tetrafluoroethylene, perfluoromethylvinylether and chlorotrifluoroethylene.

3. A composition according to claim 2, wherein the silicone resin is selected from a group consiting of resin containing trimethylsiloxane and silicate units; resin containing trimethylsiloxane, vinyldimethylsiloxane and silicate units; resin containing phenylsiloxane propylsiloxane and silicate units; resin containing phenylsiloxane units; resin containing methylsiloxane, phenylsiloxane, diphenylsiloxane, and phenylmethylsiloxane units; resin containing trifluoropropyldimethylsiloxane, silicate and trimethylsiloxane units; and resin containing phenylsiloxane, diphenylsiloxane, and aminopropylsiloxane units.

4. A composition according to claim 2, wherein the composition comprises 1 to 40% by weight of polydiorganosiloxane gum selected from a group consisting of polydimethylsiloxane gum, polyphenylmethylsiloxane gum, polymethylvinylsiloxane gum, a copolymer gum comprised of phenylmethylsiloxane and methylvinylsiloxane units, a copolymer gum comprised of dimethylsiloxane and methylvinylsiloxane units, 5. A composition according to claim 3, wherein the composition comprises 1 to 40% by weight of polydiorganosiloxane gum selected from a group consisting of polydimethylsiloxane gum, polyphenylmethylsiloxane gum, polymethylvinylsiloxane gum, a copolymer gum comprised of phenylmethylsiloxane and methylvinylsiloxane units, a copolymer gum comprised of dimethylsiloxane and methylvinylsiloxane units, 6. A composition according to claim 2, wherein the composition comprises 1 to 40% by weight of hydrocarbon polymer elastomer selected from the group consisting of ethylene-propylene-diene polymer, natural rubber, ethylene-propylene copolymers, styrene-butadiene copolymers, polyisobutylene, polyisoprene, and polybutadiene.

7. A composition according to claim 3, wherein the composition comprises 1 to 40% by weight of hydrocarbon polymer elastomer selected from the group consisting of ethylene-propylene-diene polymer, natural rubber, ethylene-propylene copolymers, styrene-butadiene copolymers, polyisobutylene, polyisoprene, and polybutadiene.

8. A cured fluorocarbon rubber obtained from a composition comprising:
   (I) 100 parts by weight of a fluorocarbon rubber base containing
      (a) 50 to 95% by weight of a fluorocarbon elastomer having a Mooney viscosity of 5 to 160,
      (b) 5 to 50% by weight of an amorphous silicone resin having a degree of substitution of about 0.9 to 1.8,
      (c) 0 to 40% by weight of polydiorganosiloxane gum, and
      (d) 0 to 40% by weight of hydrocarbon polymer elastomer;
   (II) 0.5 to 15 parts by weight of an acid acceptor;
   (III) 0.5 to 10 parts by weight of a curing agent; and
   (IV) 2 to 60 parts by weight of a filler.

9. A composition according to claim 8, wherein the fluorocarbon elastomer is selected from a group consisting of copolymers of vinylidene fluoride and hexafluoropropene; copolymers of tetrafluoroethylene and ethylene or propylene; terpolymers of vinylidene fluoride, hexafluoropropene, and tetrafluoroethylene; terpolymers of vinylidene fluoride, tetrafluoroethylene, and perfluoromethylvinylether; tetrapolymers of vinylidene fluoride, hexafluoropropene, and tetrafluoroethylene and chlorotrifluoroethylene; and tetrapolymers of vinylidene fluoride, tetrafluoroethylene, perfluoromethylvinylether and chlorotrifluoroethylene.

10. A composition according to claim 9, wherein the silicone resin is selected from a group consisting of resin containing trimethylsiloxane and silicate units; resin containing trimethylsiloxane, vinyldimethylsiloxane and silicate units; resin containing phenylsiloxane and propylsiloxane units; resin containing phenylsiloxane units; resin containing methylsiloxane, phenylsiloxane, diphenylsiloxane, and phenylmethylsiloxane units; resin containing trifluoropropyldimethylsiloxane, silicate and trimethylsiloxane units; and resin containing phenylsiloxane, diphenylsiloxane, and aminopropylsiloxane units.

11. A composition according to claim 9, wherein the composition comprises 1 to 40% by weight of polydiorganosiloxane gum selected from a group consisting of polydimethylsiloxane gum, polyphenylmethylsiloxane gum, polymethylvinylsiloxane gum, a copolymer gum comprised of phenylmethylsiloxane and methylvinylsiloxane units, a copolymer gum comprised of dimethylsiloxane and methylvinylsiloxane units, 12. A composition according to claim 10, wherein the composition comprises 1 to 40% by weight of polydiorganosiloxane gum selected from a group consisting of polydimethylsiloxane gum, polyphenylmethylsiloxane gum, polymethylvinylsiloxane gum, a copolymer gum comprised of phenylmethylsiloxane and methylvinylsiloxane units, a copolymer gum comprised of dimethylsiloxane and methylvinylsiloxane units.

13. A composition according to claim 9, wherein the composition comprises 1 to 40% by weight of hydrocarbon polymer elastomer selected from the group consisting of ethylene-propylene-diene polymer, natural rubber, ethylene-propylene copolymers, styrene-butadiene copolymers, polyisobutylene, polyisoprene, and polybutadiene.

14. A composition according to claim 10, wherein the composition comprises 1 to 40% by weight of hydrocarbon polymer elastomer selected from the group consisting of ethylene-propylene-diene polymer, natural rubber, ethylene-propylene copolymers, styrenebutadiene copolymers, polyisobutylene, polyisoprene, and polybutadiene.

15. A composition according to claim 10, wherein the acid acceptor is selected from a group consisting of calcium hydroxide, magnesium oxide, lead oxide, lead hydrogenphosphate, and calcium oxide; and the filler is selected from a group consisting of carbon black, coal dust fines, silica, iron oxide, zinc oxide, zinc sulfide, calcium carbonate, and barium sulfate.

16. A composition according to claim 9, wherein the curing agent is selected from the group consisting of (A) a bisphenol and a organic onium salt accelerator, (B) a polyfunctional organic amine or carbamate, and (C) an organic peroxide and a cure promoter effective to improve the cure.

17. A composition according to claim 10 wherein the curing agent is an organic peroxide with a decomposition temperature in the range of 75° to 175° C. combined with triallylisocyanurate.

18. A composition according to claim 11 wherein the curing agent is 2,5-dimethyl-2,5-di(t-butylperoxy)hexane combined with triallylisocyanurate.

19. A composition according to claim 15 wherein the curing agent is an organic peroxide with a decomposition temperature in the range of 75° to 175° C. combined with triallylisocyanurate.

20. A composition according to claim 15 wherein the curing agent is 2,5-dimethyl-2,5-di(t-butylperoxy)hexane combined with triallylisocyanurate.

* * * * *